Figure 1:
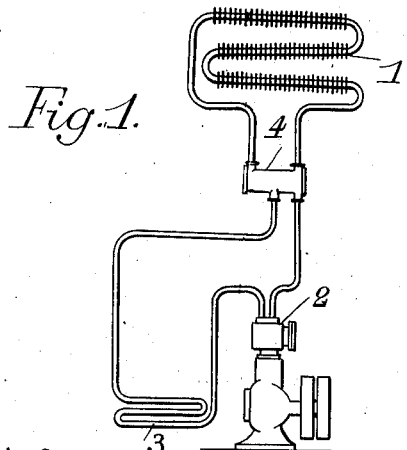

F. A. POLLARD.
AUTOMATIC REGULATOR FOR REFRIGERATING SYSTEMS.
APPLICATION FILED JAN. 22, 1910.

990,772.

Patented Apr. 25, 1911.

Witnesses:

Inventor,
Frédéric Augustin Pollard,
by his Attorney.

UNITED STATES PATENT OFFICE.

FRÉDÉRIC AUGUSTIN POLLARD, OF PARIS, FRANCE.

AUTOMATIC REGULATOR FOR REFRIGERATING SYSTEMS.

990,772.

Specification of Letters Patent.  Patented Apr. 25, 1911.

Original application filed December 4, 1908, Serial No. 466,028. Divided and this application filed January 22, 1910. Serial No. 539,500.

*To all whom it may concern:*

Be it known that I, FRÉDÉRIC AUGUSTIN POLLARD, a citizen of the Republic of France, residing at Paris, France, have invented certain new and useful Improvements in Automatic Regulators for Refrigerating Systems; and I do hereby declare the following to be a full, clear, and exact description of the invention, such as will enable others skilled in the art to which it appertains to make and use the same.

This invention relates to apparatus for the automatic regulation of refrigerating machines which utilize liquefied gases such as sulfuric acid, methyl chlorid, ammonia, carbonic acid and the like, and is a division of my pending application, Serial Number 466028. In nearly all forms of apparatus of this type, the distribution of the liquefied gas to the coil or other refrigerating vessel is regulated by hand. This is practicable with machines which always work under the same conditions of speed and temperature. There are, however, cases in which, by reason of variations in the conditions of working, such as variations in the speed of the compressor, in the temperature of the medium to be cooled (air, gas or liquid), or in the temperature at which the liquefied gas condenses, a single adjustment does not suffice, but the man in charge of the machine is compelled to continually adjust the distribution of the liquefied gas, in order to obtain so far as possible the maximum efficiency of the machine under the varying conditions.

Apart from the advantage that there is in automatically regulating all refrigerating machines in the manner most conducive to efficiency, such automatic regulation is absolutely essential with machines intended to operate without any supervision under most extreme conditions of working, for example, when the refrigerating machine is employed to refrigerate moving vans or carriages and is driven directly from one of the axles, in order that the machine shall work with the maximum efficiency at all speeds of the compressor, at any and all temperatures of the compartment, and at various condensation temperatures of the liquefied gas. Refrigerating plants have been constructed which endeavor to obtain this result by the combination of several devices, one of which regulates the operation according to the speed of the compressor and the other according to the temperature of the medium to be cooled.

The principle of my invention is based upon the observation, resulting both from theory and experiment, that the most advantageous method of working refrigerating machines is obtained when the compressor is drawing in dry saturated gas, whatever may be the speed of the compressor and the temperatures of vaporization and condensation of the liquefied gas. The method employed by me for attaining this object consists in slightly overheating the gas sucked in by the compressor, this being obtained by passing the saturated gas through a radiator placed, either in the fluid to be refrigerated or in the surrounding atmosphere, and in utilizing the difference of the temperatures of the gas at its entry into the refrigerator and at its outlet from the radiator to actuate a valve controlling the flow of the liquefied gas. According to this invention, also, is utilized the unequal variations in length of two bodies of any section and shape, solid or hollow, or filled entirely or partly with a volatile or other liquid, when submitted, the one to the temperature of the gas at its entrance into the refrigerator, and the other at its outlet from the same. The variation in length of these rods, which may be amplified by levers or other devices, is employed to actuate the inlet valve, which must be closed when the two bodies of the regulating apparatus are at the same temperatures and entirely open when the predetermined maximum difference exists between these temperatures. When the compressor of the machine is at rest, the temperature of the two bodies having become equal, the valve would remain closed indefinitely even if the compressor be again set in motion, and no liquefied gas would pass into the refrigerator. In order to permit starting under these conditions, a hole of small size is permanently arranged in the regulating apparatus or valve in order that when starting there may be obtained a suitable difference between the temperatures of the bodies and the apparatus may consequently be able to start. The radiator may, moreover, for the sake of greater simplicity consist of the end of the refrigerator.

Specifically this invention consists of an apparatus whose working is based upon the expansion of two masses of liquid contained within two elastic tubes, or upon the expansion of a gas liquefied at varying pressure according to its temperature and contained in the same way within elastic tubes.

The invention as hereinafter particularly pointed out in the claims, will now be fully described in connection with the accompanying drawings illustrating one embodiment of the same, wherein—

Figure 2:
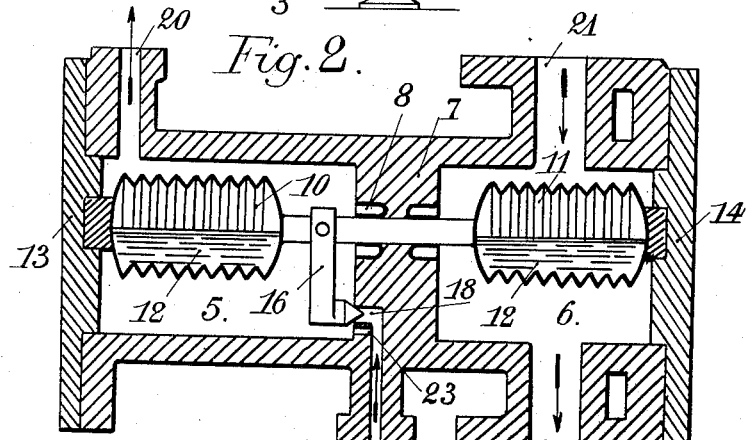
Figure 3:
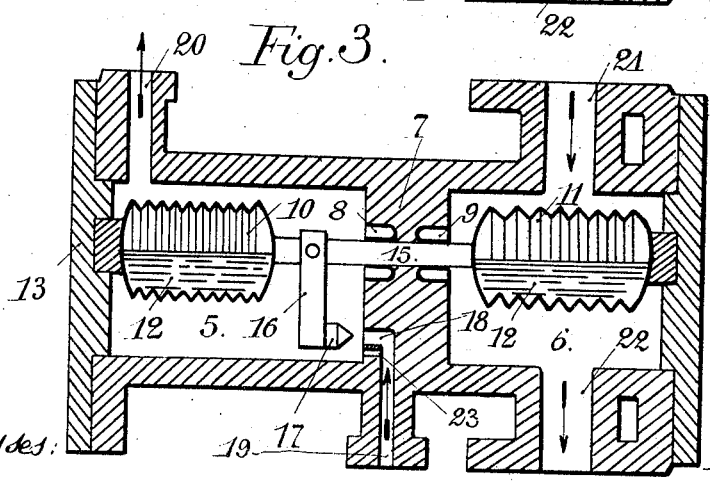

Figure 1 is a diagrammatic view showing an entire system; Fig. 2 is a sectional view of the regulating device when at rest with the valve closed; and Fig. 3 is a similar view when in operation and with the valve open.

In Fig. 1 the refrigerator is represented at 1, the compressor at 2, the condenser at 3, and the regulator at 4. The regulator comprises, as shown in Figs. 2 and 3, two containers 5 and 6, placed opposite each other and separated by a partition 7 provided with glands 8 and 9. Within each container is an elastic tube or vessel 10, 11, inclosing a liquid or liquefied gas 12 acting by expansion. These elastic tubes 10 and 11 are fixed to the ends 13 and 14 of the containers 5 and 6, and are connected together rigidly by the rod 15 passing through the glands 8 and 9. The arm 16 fixed upon the rod 15 and provided with a valve 17 closes the hole 18, which communicates through the pipe 19 with the condenser 3, when the compressor 2 of the refrigerating machine is at rest. The pipe 20 communicates with the entrance to the refrigerator 1, the pipe 21 with the outlet from the refrigerator, and the pipe 22 with the suction of the compressor. A small hole 23, which places the pipe 19 and the container 5 in communication, insures the starting of the apparatus.

When the compressor of the refrigerating machine is at rest, the temperatures of the liquid or of the liquefied gas 12 contained within the elastic tubes or closed fluid-containing vessels 10 and 11 are equal, the expansion of the tubes will thus be equal and in opposite directions and the rod 15 will not move. So soon as the compressor is started the liquefied gas introduced from 19 to 5 through the permanent hole 23 vaporizes and lowers the temperature of the elastic tube 10 and of the liquid or gas which it contains, whence the pressure exerted by the tube 11 will predominate and displace the rod 15 and move the valve 17 toward the left of the figure and opens the hole 18. When by reason of the introduction of an excess of liquefied gas into the refrigerator, the difference in the temperature of this gas at its outlet from the regulating apparatus and from the refrigerator tends to become *nil*, the tube 11 will in its turn contract, thus causing the valve 17 to partially close the orifice 18 until suitably regulated.

Obviously this device is equally well suited for regulating either cooling or heating systems, the differences in temperatures at the inlet and outlet of the radiator (whether a cooling or heating coil) serving in either case to control the valve, and the term refrigerator is used herein in a generic sense as applying to a temperature modifying body.

What I claim and desire to secure by Letters Patent, is:—

1. In a regulator for temperature modifying systems, a radiator having an inlet and an outlet for a modifying medium, two thermostats consisting of closed fluid-containing vessels arranged one under the influence of the medium entering and the other under the influence of the medium leaving the radiator, the thermostats operating one to open and the other to restrict the supply of temperature modifying medium.

2. In a regulator for temperature modifying systems, a radiator, means supplying the modifying fluid thereto and exhausting the fluid therefrom, a valve controlling the flow of the fluid, two closed fluid-containing expansion bodies, one arranged in the path of the fluid entering and the second in the path of the fluid leaving the radiator, and a connection between the two expansion bodies and the valve, the expansion of one body tending to open the valve and the expansion of the other body to close the same.

3. In a regulator for temperature modifying systems, a radiator, means supplying the modifying fluid thereto and exhausting the fluid therefrom, a valve controlling the flow of the fluid, two expansion bodies, one arranged in the path of the fluid entering and the second in the path of the fluid leaving the radiator, a rod connecting the two expansion bodies, and a connection between the rod and the valve, the movement of the rod in one direction tending to open the valve and its movement in the other direction tending to close the same.

4. In a regulator for refrigerating systems and the like, a refrigerator, means supplying the refrigerating fluid thereto and exhausting the fluid therefrom, a valve controlling the flow of the fluid, two expansion vessels arranged one in the path of the fluid entering and the second in the path of the fluid leaving the refrigerator, and a connection between the two expansion vessels and the valve, the contraction of the first expansion vessel tending to open the valve and the contraction of the other tending to close the same.

5. In a regulator for refrigerating systems and the like, a refrigerator, means supplying the refrigerating fluid thereto and exhausting the fluid therefrom, a valve controlling the flow of the fluid, two expansion vessels arranged one in the path of the fluid entering and the second in the path of the fluid leaving the refrigerator, a rod connecting the two vessels, and a connection between the rod and the valve, the movement of the rod in one direction tending to open the valve and its movement in the other direction tending to close the same.

6. In a regulator for temperature modifying systems, a radiator, means supplying the modifying fluid thereto and exhausting the fluid therefrom, a valve controlling the flow of the fluid, two expansion bodies, one arranged in the path of the fluid entering and the second in the path of the fluid leaving the radiator, and a connection between the two expansion bodies and the valve, the expansion of one body tending to open the valve and the expansion of the other body to close the same, the device provided with a permanently open by-pass around the valve to influence the valve opening body.

7. In a regulator for temperature modifying systems, a radiator, means supplying the modifying fluid thereto and exhausting the fluid therefrom, a valve controlling the flow of the fluid, two expansion bodies, one arranged in the path of the fluid entering and the second in the path of the fluid leaving the radiator, a rod connecting the two expansion bodies, and a connection between the rod and the valve, the movement of the rod in one direction tending to open the valve, and its movement in the other direction tending to close the same, the device provided with a permanently open by-pass around the valve to influence the valve opening body.

8. In a regulator for refrigerating systems and the like, a refrigerator, means supplying the refrigerating fluid thereto and exhausting the fluid therefrom, a valve controlling the flow of the fluid, two expansion vessels arranged one in the path of the fluid entering and the second in the path of the fluid leaving the refrigerator, and a connection between the two expansion vessels and the valve, the contraction of the first expansion vessel tending to open the valve and the contraction of the other tending to close the same, the device provided with a permanently open by-pass around the valve to influence the valve opening expansion vessel.

9. In a regulator for refrigerating systems and the like, a refrigerator, means supplying the refrigerating fluid thereto and exhausting the fluid therefrom, a valve controlling the flow of the fluid, two expansion vessels arranged one in the path of the fluid entering and the second in the path of the fluid leaving the refrigerator, a rod connecting the two vessels, and a connection between the rod and the valve, the movement of the rod in one direction tending to open the valve and its movement in the other direction tending to close the same, the device provided with a permanently open by-pass around the valve to influence the valve opening expansion vessel.

10. In a refrigerating system or the like, a refrigerator, means supplying refrigerating fluid thereto and exhausting the fluid therefrom, and a regulator comprising a casing having two isolated chambers, the first traversed by the fluid entering the refrigerator and the second by the fluid leaving the same, an expansion body in each chamber, a valve controlling the flow of the fluid through the first chamber, and a connection between the expansion bodies and the valve whereby the unequal expansion of the two bodies under the influence of the unequal temperature of the fluid entering and leaving the refrigerator will operate the valve.

11. In a refrigerating system or the like, a refrigerator, means supplying refrigerating fluid thereto and exhausting the fluid therefrom, and a regulator comprising a casing having two isolated chambers, the first traversed by the fluid entering the refrigerator and the second by the fluid leaving the same, an expansion body in each chamber, a valve controlling the flow of the fluid through the first chamber, a rod connecting the two expansion bodies, and a connection between the rod and valve whereby the unequal expansion of the two bodies under the influence of the unequal temperature of the fluid entering and leaving the refrigerator will operate the valve.

12. In a refrigerating system or the like, a refrigerator, means supplying refrigerating fluid thereto and exhausting the fluid therefrom, and a regulator comprising a casing having two isolated chambers, the first traversed by the fluid entering the refrigerator and the second by the fluid leaving the same, an expansion body in each chamber, a valve controlling the flow of the fluid into the first chamber, a connection between the two expansion bodies and valve to open the valve as the first body contracts and to close the valve as the second body contracts.

13. In a refrigerating system or the like, a refrigerator, means supplying refrigerating fluid thereto, and exhausting the fluid therefrom, and a regulator comprising a casing having two isolated chambers, the first traversed by the fluid entering the refrigerator and the second by the fluid leaving the same, an expansion vessel in each chamber arranged to contain an expansible fluid, a valve controlling the flow of the fluid into the first chamber, a rod extending through the wall between the two chambers and connecting the two vessels, and a connection between the rod and the valve whereby a maximum inequality of expansion of the two vessels under the influence of the temperature of the refrigerating fluid entering and leaving the refrigerator will open the valve and a minimum inequality of expansion will close the valve.

14. In a refrigerating system or the like, a refrigerator, means supplying refrigerating fluid thereto and exhausting the fluid therefrom, and a regulator comprising a casing having two isolated chambers, the first traversed by the fluid entering the refrigerator and the second by the fluid leaving the same, an expansion body in each chamber, a valve controlling the flow of the fluid through the first chamber, and a connection between the expansion bodies and the valve whereby the unequal expansion of the two bodies under the influence of the unequal temperature of the fluid entering and leaving the refrigerator will operate the valve, the device provided with a permanently open by-pass around the valve to influence the valve opening body.

15. In a refrigerating system or the like, a refrigerator, means supplying refrigerating fluid thereto, and exhausting the fluid therefrom, and a regulator comprising a casing having two isolated chambers, the first traversed by the fluid entering the refrigerator and the second by the fluid leaving the same, an expansion vessel in each chamber arranged to contain an expansible fluid, a valve controlling the flow of the fluid into the first chamber, a rod extending through the wall between the two chambers and connecting the two vessels, and a connection between the rod and the valve whereby a maximum inequality of expansion of the two vessels under the influence of the temperature of the refrigerating fluid entering and leaving the refrigerator will open the valve and a minimum inequality of expansion will close the valve, the device provided with a permanently open by-pass around the valve to influence the valve opening expansion vessel.

In testimony whereof I hereunto affix my signature in the presence of two witnesses.

FRÉDÉRIC AUGUSTIN POLLARD.

Witnesses:
H. C. COXE,
G. DE MESTRAL.